Dec. 9, 1952　　　　　A. E. ZIMMER ET AL　　　　2,620,745
SHAFT BEARING AND HUB CASTING FOR ROTATABLE SHAFT
DOOR OPERATING MECHANISM FOR RAILROAD DUMP CARS
Filed Aug. 29, 1947　　　　　　　　　　3 Sheets-Sheet 1
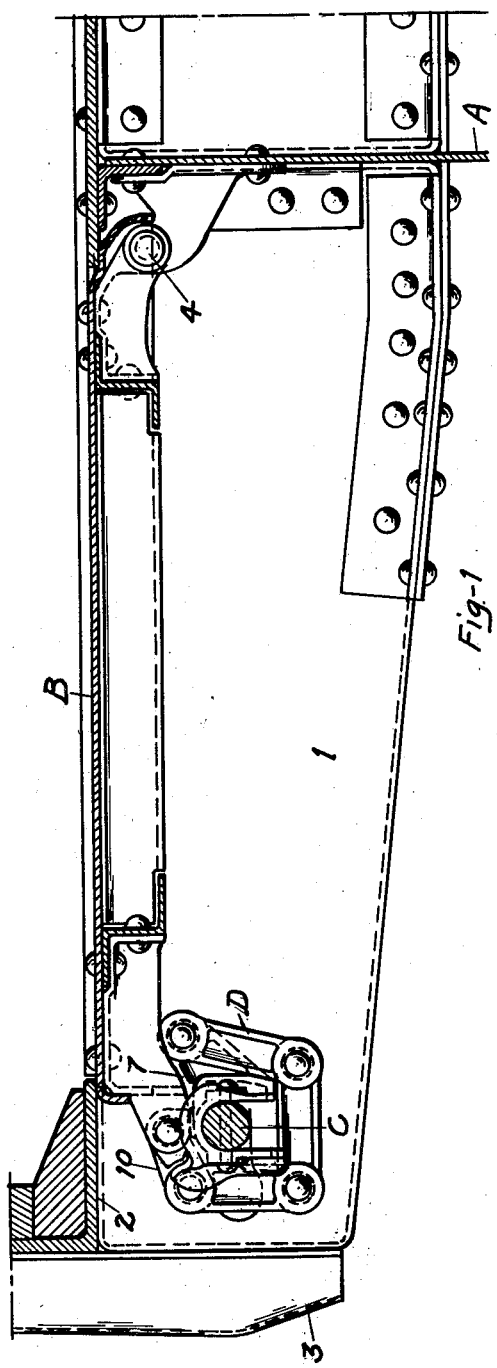
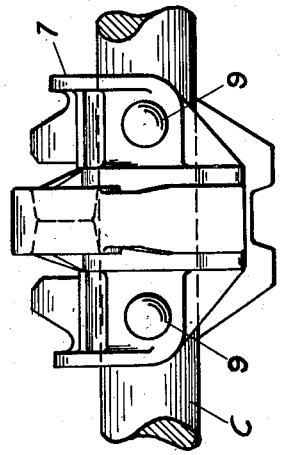
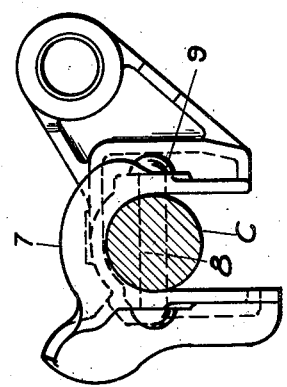
INVENTOR.
Albert E. Zimmer.
William F. Batho.
BY George D. Haight
ATTORNEY.

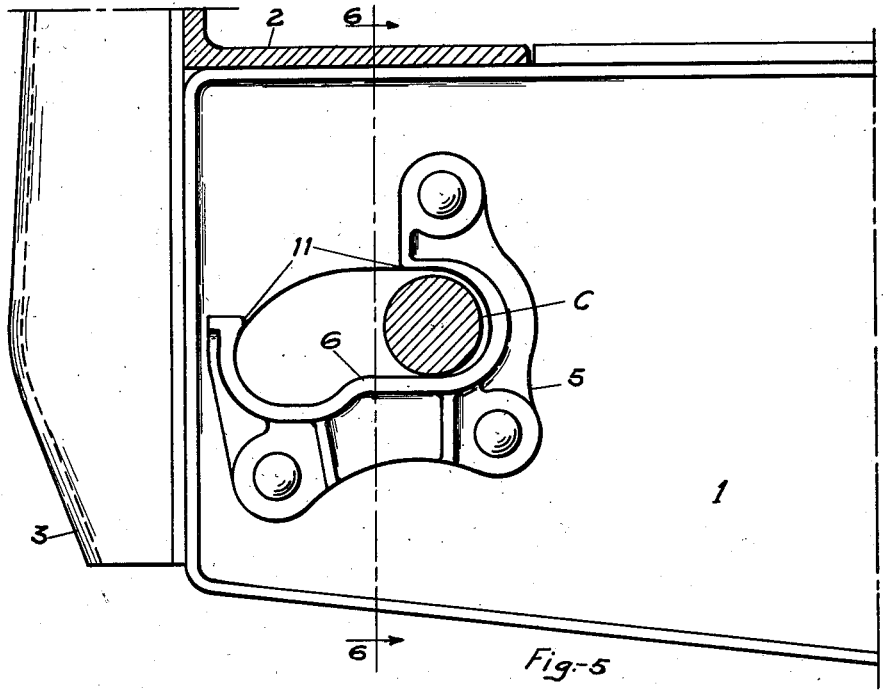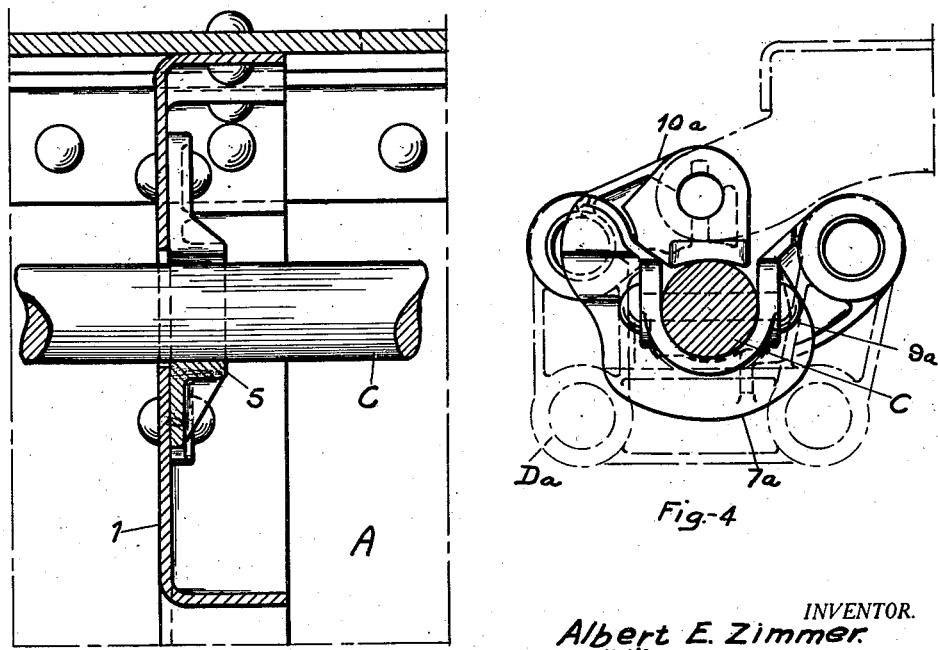

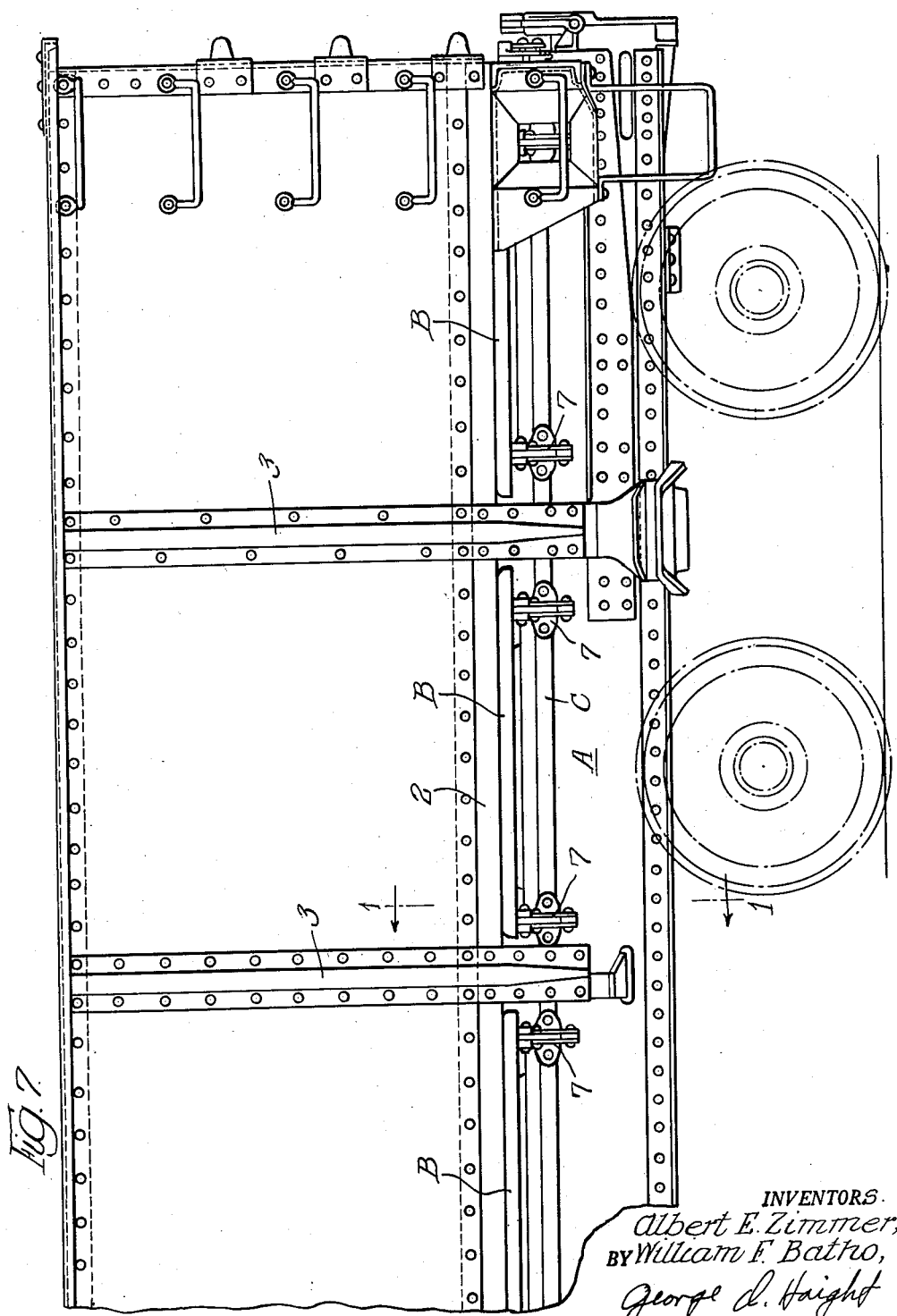

Patented Dec. 9, 1952

2,620,745

UNITED STATES PATENT OFFICE 2,620,745

SHAFT BEARING AND HUB CASTING FOR ROTATABLE SHAFT DOOR OPERATING MECHANISM FOR RAILROAD DUMP CARS

Albert E. Zimmer and William F. Batho, Chicago, Ill., assignors to Enterprise Railway Equipment Company, Chicago, Ill., a corporation of Illinois Application August 29, 1947, Serial No. 771,186

5 Claims. (Cl. 105—301)

Our invention relates to improvement in dump car door operating mechanisms, and is especially related to that general type of door operating mechanism having a rotatable shaft adapted to shift laterally from a position beyond the free edge of the door to a supporting position beneath the free edge thereof.

In this type of car a single shaft is arranged in a plurality of bearings to operate a plurality of doors. Each door is connected to the shaft by flexible connections, such as pivotally connected links or chains, which are attached to hub castings upon the shaft and wind around the shaft to close the door. In existing cars the bearings and hub castings surround the shaft.

It sometimes occurs that one or more of these bearings or hub castings become damaged or broken, making it necessary to replace the damaged part before the doors can be operated. In the usual type of mechanism it has been necessary to cut loose all the hub castings and to remove the shaft to be able to remove and replace the damaged or broken part.

The principal object of our invention is to overcome the necessity of cutting loose all the hub castings in order to replace a damaged or broken bearing or hub casting without necessitating the removal of the operating shaft.

This and other objects of our invention find their selected embodiment in the construction, combination and arrangement of parts hereinafter described in connection with the accompanying drawings.

Fig. 1 is a vertical transverse section, taken generally along line 1—1 of Figure 7, through one half of the underframe of the car, showing one of the dump doors and the shaft and flexible connections associated therewith for opening and closing the door;

Fig. 2 is an enlarged side elevation view of the U shaped hub casting used at the shaft end of the flexible connection between shaft and door;

Fig. 3 is an enlarged front elevation view of the hub casting illustrated in Fig. 2;

Fig. 4 is an enlarged side elevation of an alternative embodiment of the U shaped hub casting with the flexible links being shown by broken lines, showing that the hub casting may be left open at its top with only a slight modification of the hub link permitting the latter to rest on top of the operating shaft;

Fig. 5 is an enlarged front elevation of one of several shaft support bearings;

Fig. 6 is a partial cross section substantially on line 6—6 of Fig. 5; and

Figure 7 is a view, in side elevation of a portion of a railway car in which our invention is embodied.

In the drawings we have shown a door operating mechanism especially adapted for cars of the drop bottom door type, which have a plurality of doors on each side of the center sill. The doors are operated from the ends of the car through the medium of a longitudinal shaft which extends just underneath the car side sills. In cars of this type, each shaft is arranged to operate several doors simultaneously, but in the drawings we have illustrated only one of the winding mechanisms operated by the shaft for opening and closing the doors since the others are duplicates thereof.

The car as shown has a center sill A, crossbearer 1, side sill 2, and side stake 3. Each discharge opening thus provided between the center and side sills and crossbearers is closed by a door B. Each door is hinged at 4, at its inner margin adjacent the center sill and is adapted to swing about the hinge axis to open and closed positions.

The operating shaft C is mounted in generally J-shaped bearing castings 5 which are secured to and supported by the crossbearers 1. These bearings are formed with elongated bearing surfaces 6 which permit a lateral shifting of the shaft upon rotation in a generally horizontal direction so that the shaft moves bodily upon rotation into or out of door supporting position.

The shaft C is connected with the door by flexible connections forming winding mechanisms adapted to swing the door to open and closed positions. Generally two winding mechanisms are provided for each door which the shaft serves. The flexible connection between the door and shaft comprises a flexible link chain D, one end of which is secured to the door B and the other end of which is connected to a hub casting 7. The hub casting is riveted to the operating shaft C by rivets 9, as at 8.

It frequently happens that one or more of the bearings and hub castings may become broken or damaged to the extent that they must be replaced. In the usual type of bearings and hubs, it thereupon becomes necessary to cut loose the rivets 9, holding all of the hubs to the operating shaft and to remove the shaft entirely from the damaged or broken parts.

Such removal is not necessary with the hub and bearings of our invention. The hub is substantially U shaped and rests astride the operating shaft as shown in Figs. 1 and 2.

By so constructing the hub casting, any damaged or broken casting may be removed simply and easily by removing the rivet 9 and slipping the casting off the shaft C. It is no longer necessary to remove all of the other castings.

The hub casting may be made to fit underneath the operating shaft as illustrated by casting 7a in Fig. 4. In using this modification, a slight alteration is made in link 10a connecting the chain D to the door B whereby the link is made to rest directly on the operating shaft instead of on the hub casting.

In the conventional design of bearing member 5, the bearing wall 11 forms an elongated slot wherein the shaft operates and completely surrounds the operating shaft. Conventional bearing members for the shaft thus also require the removal of all of the hub castings, together with the shaft, to replace a damaged or broken bearing. In the improved bearing member, a substantial part of the top wall of the bearing 5 is omitted, as at 11. This permits an easy replacement of the bearing should it become damaged or broken.

In both the specification and the claims, the bearing member and the hub casting have been described as a "casting." Obviously the bearing or the hub member may be fabricated in any other manner and it is the applicants' contention that the term "casting" should include the bearing member or the hub member in whatever manner it is fabricated.

Having thus described the selective embodiment of our invention, it is understood that various modifications may be made, our invention being described in the following claims:

1. For combination with a railroad dump car or the like having a plurality of doors hinged along their inner edges to open downwardly, flexible connecting members fastened to said doors for controlling the movement thereof, and crossbearers extending below and between said doors in their closed positions with registering slotted openings therein along the outer edges of said doors; an operating shaft extending through said slotted openings and common to said doors, a plurality of J-shaped bearing members mounted on said crossbearers with their bearing openings registering with said slotted openings for rotatably and translatorily mounting said shaft and with the slots between the ends of said J-shaped bearing members opening upwardly, said shaft being bodily movable on said J-shaped bearings into and out of operative engagement with said doors to hold them closed and to release them, and a plurality of hub members fastened on said shaft one for each flexible connecting member and fastened to one end thereof for winding thereon on rotation of said shaft to close said doors and for unwinding therefrom to open said doors, each hub member being generally U-shaped, the slotted openings of said J-shaped bearing members and of said U-shaped hub members making it possible to remove the same from said cross bearers and shaft respectively and install or replace the same thereon while said shaft remains in position in said slotted openings in said crossbearers.

2. A generally J-shaped bearing member for mounting on a crossbearer of a railway dump car with the opening therein facing upwardly and the stem portion extending generally horizontally for translatorily receiving thereon a transversely extending shaft employed for moving dump doors and locking the same closed, said opening being greater in size than that of the hook end of said bearing member whereby the same can be removed from the crossbearer and replaced without requiring that the shaft be removed, said bearing member being a casting having the inner bearing surface thereof formed on a flange having a width substantially greater than the thickness of the body portion of the bearing member, said flange near its outer end portion being recessed downwardly for receiving the shaft at a lower level than it is received at its inner end portion, said flange defining the inner surface of the J-shape and at its ends having reinforcements cast integrally therewith and with the body portion of the J-shaped bearing member.

3. For combination with a rotatably mounted shaft extending longitudinally of a railway dump car for operating the doors thereof, a hub member having a generally U-shaped central section for interfitting with substantially half of said shaft and having the arms of the U extending substantially beyond a plane normal thereto and extending through the longitudinal axis of said shaft whereby said hub member can be applied to and removed from said shaft without requiring that it be telescoped therewith, clamping means cooperating with said hub member to hold the same on said shaft, an arm formed integrally with and extending radially from said hub, and a chain secured at one end to said arm for connection at the other end to said door and adapted to be wound around said U-shaped central section with one link at the open end thereof.

4. For combination with a rotatably mounted shaft extending longitudinally of a railway dump car for operating the doors thereof, a hub member having a generally U-shaped central section for interfitting with substantially half of said shaft and having the arms of the U extending substantially beyond said shaft whereby said hub member can be applied to and removed from said shaft without requiring that it be telescoped therewith, clamping means cooperating with said hub member to hold the same on said shaft, an arm formed integrally with and extending radially from said hub, and a chain secured at one end to said arm for connection at the other end to said door and adapted to be wound around said U-shaped central section with one link bridging the ends of said arms.

5. For combination with a rotatably mounted shaft extending longitudinally of a railway dump car for operating the doors thereof, a hub member having a generally U-shaped central section for interfitting with substantially half of said shaft and having the arms of the U extending so that the ends thereof are substantially in alignment with the side of said shaft opposite said half whereby said hub member can be applied to and removed from said shaft without requiring that it be telescoped therewith, clamping means cooperating with said hub member to hold the same on said shaft, an arm formed integrally with and extending radially from said hub, and a chain secured at one end to said arm for connection at the other end to said door and adapted to be wound around said U-shaped central section with the link at said other end of said chain bearing against said side of said shaft at the open end of said U when said chain is wound thereon.

ALBERT E. ZIMMER.
WILLIAM F. BATHO.

REFERENCES CITED

The following references are of record in the file of this patent:

UNITED STATES PATENTS

| Number | Name | Date |
|---|---|---|
| 504,193 | Baxter et al. | Aug. 29, 1893 |
| 653,313 | Raifsnyder | July 10, 1900 |
| 736,304 | Scott et al. | Aug. 11, 1903 |
| 865,561 | Becker | Sept. 10, 1907 |
| 993,082 | Lindstrom | May 23, 1911 |
| 1,064,004 | Posson | June 10, 1913 |
| 1,201,863 | Orey | Oct. 17, 1916 |
| 1,388,950 | Hosceit | Aug. 30, 1921 |
| 1,389,449 | Kubik | Aug. 30, 1921 |
| 1,705,806 | Campbell | Mar. 19, 1929 |